United States Patent [19]

Daniel

[11] Patent Number: 4,466,697
[45] Date of Patent: Aug. 21, 1984

[54] LIGHT DISPERSIVE OPTICAL LIGHTPIPES AND METHOD OF MAKING THE SAME

[76] Inventor: Maurice Daniel, 550 Jaycox Rd., Avon Lake, Ohio 44012

[21] Appl. No.: 320,576

[22] Filed: Nov. 12, 1981

[51] Int. Cl.³ .............................................. G02B 5/172
[52] U.S. Cl. ................................. 350/96.30; 350/96.10
[58] Field of Search ............... 350/96.23, 96.29, 96.30, 350/96.32, 96.10

[56] References Cited

U.S. PATENT DOCUMENTS

| | | | |
|---|---|---|---|
| 3,090,931 | 5/1963 | Marcatili | 333/249 |
| 3,403,955 | 10/1968 | Jueneman | 350/96.33 |
| 3,506,331 | 4/1970 | Kompfner | 350/96.10 X |
| 3,508,589 | 4/1970 | Derick | 139/420 |
| 3,653,739 | 4/1972 | Strack | 350/96.32 X |
| 3,746,424 | 7/1973 | Hermstein | 350/96.23 |
| 3,902,879 | 9/1975 | Siegmund | 350/96.30 X |
| 3,920,312 | 11/1975 | Siegmund | 350/96.32 |
| 4,195,907 | 4/1980 | Zamja et al. | 350/96.32 |
| 4,234,907 | 11/1980 | Daniels | 362/32 |
| 4,422,719 | 12/1983 | Orcutt | 350/96.30 |

FOREIGN PATENT DOCUMENTS 2638406 2/1978 Fed. Rep. of Germany ... 350/96.30
37441 3/1977 Japan ................... 350/96.30
1558404 1/1980 United Kingdom ......... 350/96.32

OTHER PUBLICATIONS

"Handbook of Fiber Optics: Theory and Applications", Helmut Wolf Ed., pp. 257-258, Garland STPM Press, 1979.

Primary Examiner—John D. Lee
Assistant Examiner—Frank González
Attorney, Agent, or Firm—Sixbey, Friedman & Leedom

[57] ABSTRACT

The optical lightpipes are provided with an internal structural configuration which enables the pipes to either transmit light with greater efficiency or to emit light more effectively along the length of the lightpipe. For light emission, light transmitting optical fibers are doped in the core region with refractive and/or reflective light scattering particles. When with a single optical fiber lightpipe, ribs are formed on the exterior of the lightpipe to prevent the lightpipe from being deformed to an angle greater than the critical angle for light conductance. A single tubular lightpipe of plastic may be formed with an internal reflective layer and outer ribs to control bending of the pipe.

15 Claims, 8 Drawing Figures

LIGHT DISPERSIVE OPTICAL LIGHTPIPES AND METHOD OF MAKING THE SAME

TECHNICAL FIELD

This invention is directed to optical light transmitting and emitting elements, and more particularly to optical elements having core structures designed to enhance light emission or transmission.

BACKGROUND ART

In the past, a number of different methods have been developed for causing conventional optical fibers to emit light. U.S. Pat. Nos. 3,508,589 to B. N. Derick et al and 4,234,907 to M. Daniel disclose methods for causing clad or unclad optical fibers to emit light along the length of the fiber. These methods all involve scratching, abrading, chemically deforming, or otherwise removing or disturbing portions of the cladding of the optical fibers so that a small percentage of light travelling down the length of the fibers is emitted through the deformities in the cladding. Unfortunately, however, with a deformed optical fiber, a far greater intensity of light is scattered in the forward direction of light conductivity at small angles relative to the central longitudinal axis of the fiber. Thus, when light emitting fabrics or light emitting optical fiber lighting fixtures are formed from deformed optical fibers, only a small fraction of light is emitted perpendicular to the outer surface of the fabric or layer of optical fibers. When such fabric is viewed edge on, facing into the forward direction of light conduction, the material will appear to be very bright. Additionally, the material will appear to be of moderate brightness when viewed at perpendicular angles to the outer surface, and will appear very dark when viewed edge on along the forward direction of conduction. Consequently, there is a need for developing an optical fiber capable of providing a better angular distribution of emitted light along the fiber length.

For applications where light emitting devices such as light emitting optical fiber lighting fixtures or fabrics are employed, it is often desirable to transmit light to such devices through a single light pipe. In the past, such light pipes have often involved a cable consisting of a multiplicity of optical fibers. Such cables are not only expensive, but are also difficult to effectively couple to a light utiliziation device without extensive light losses.

DISCLOSURE OF THE INVENTION

It is a primary object of the present invention to provide a novel and improved optical fiber which is adapted to emit light along the longitudinal length of the fiber with enhanced uniformity.

Another object of the present invention is to provide a novel and improved optical fiber having a core region which is doped with refractive and/or reflective light scattering particles to provide enhanced, uniform light emission along the length of the optical fiber without the need for fiber deformation.

Another object of the present invention is to provide a novel and improved optical fiber which may be employed to form light emitting fabrics adapted to be encapsulated in a transparent medium, such as epoxy or plastic. Such laminated light emitting fabric is operative to provide scattered light emission which is generally unaffected by the boundary layer between the light emitting fabric and the laminate coating.

A further object of this invention is to provide a novel method for forming light emitting optical fibers having light scattering particles incorporated in the fiber core. This may be accomplished by mixing the light scattering particles with a plastic or glass core for the fiber and then extruding the mixture to form the core portion of the optical fiber.

Still another object of the present invention is to provide a novel and improved method for providing light scattering particles to an optical fiber after the fiber core is drawn and before the cladding is added.

A further object of the present invention is to provide a novel and improved tubular light pipe having an internal reflective surface of enhanced reflectivity for transmitting light to a light emitting fixture.

Another object of the present invention is to provide a novel method for forming a tubular light pipe having inner walls which are reflective to electromagnetic radiation and with reflectivity which is maximized for a specific type of beam polarization.

A still further object of the present invention is to provide a novel and improved light pipe formed from a single optical fiber made of flexible plastic having low interface loses.

These and other objects of the present invention will become readily apparent from a review of the following description and claims taken in conjunction with the accompanying drawings.

In accordance with the aforesaid objects, the present invention provides a novel and improved optical fiber including a plastic or glass core having light scattering means dispersed therethrough. The core may be coated with a layer of conventional cladding material and then encapsulated in a laminate or provided with an additional protective outer coating of transparent material. The fiber is formed by mixing reflective particles with the plastic or glass material forming the fiber core and extruding the mixture to provide a fiber core. Conversely, the fiber core is formed and then sprayed with light deflecting particles or treated with heat or radiation to create light deflecting voids within the core.

When the fiber of the present invention is employed in a lighting fixture, the fixture may be serviced by a cylindrical lightpipe of plastic material having internal walls which are reflective to electromagnetic radiation. In place of a tubular lightpipe, a lightpipe formed on a single optical fiber may be employed having plastic ribs formed on the outer surface thereof to control the degree to which such lightpipe can be bent.

BEST MODE FOR CARRYING OUT THE INVENTION

Figure 1:
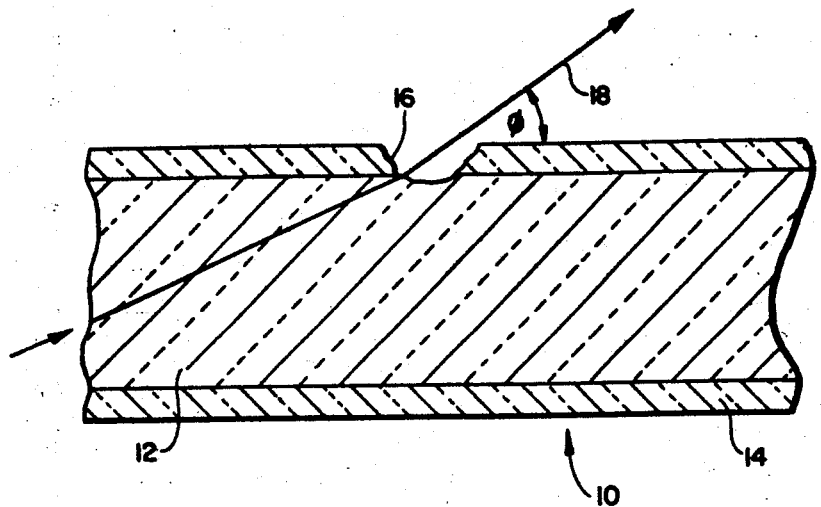
FIG. 1 is a longitudinal sectional view of a prior art optical fiber.

Referring now to FIG. 1, an optical fiber indicated generally at 10 includes an internal core 12 of light conducting plastic or glass provided with an external cladding layer 14. Light conducting fibers of this type are conventional, and in accordance with the teachings of the prior art, have been scratched, abraded, or chemically deformed to disturb portions of the cladding, or the cladding and core at deformation point 16 to cause light emission at these deformation points. Thus, a light ray 18 travelling through the fiber 10 in a forward direction from left to right in FIG. 1, is not reflected back into the fiber by the cladding 14, but is permitted to pass through the deformation point 16. It will be noted, however, that the angle $\phi$, measured between the light ray 18 and a plane parallel to the longitudinal axis of the optical fiber 10, is a very small angle. Generally, when an optical fiber is deformed as illustrated in FIG. 1, a far greater intensity of light will be scattered in the forward direction of small $\phi$ angles, and thus light emitting fabrics and lighting units made from such deformed optical fibers will emit only a small fraction of light perpendicular to the fabric or layer of optical fibers. This preferential forward scattering effect makes a light emitting unit formed from the fabric 10 appear to be of only moderate brightness when viewed perpendicular to the longitudinal axis of the fiber.

In accordance with the present invention, the core of an optical fiber may be modified to increase the perpendicular light emission from the fiber and thus alleviate the preferential forward scattering effect prevelant with deformed fibers. The scattering of light out of the core regions of an optical fiber may be accomplished by mixing a low density of light scattering particles with the plastic, or glass, core material for the optical fiber. These light scattering particles may be of a type which cause either refraction or reflection of the light travelling through the fiber core. For example, the particles may be small granules of transparent material that have a relatively higher or lower index or refraction than the core material, such as granules of plastic, glass, quartz, crystal, or air bubbles. Reflective granules may consist of metals or mirror surfaces, and a combination of both reflective and refractive granules may be employed in a single optical fiber. Additionally, the granules used may be spherical, flakes, or many faceted in shape. Obviously, not all types of scattering particles will be equally effective in scattering the light from optical fiber cores, and perpendicular scattering from the core is the most desirable. However, if perpendicular scattering cannot be accomplished, then particles which will scatter light equally in all directions are preferred. Clearly, granules of transparent refractive material are the least effective in meeting the desired scattering criteria, as refractive granules, even those having indexes of refraction very different from the core material, tend to scatter the light in the forward direction at relatively low angles. However, refractive granules or spheres do have very low light absorption, unlike reflective metallic particles which may absorb from 2% to 20% of the incident light upon each reflection. Reflection particles, such as granules or spheres of silver, aluminum, or the like, have little forward scatter and considerable back scatter with high amounts of perpendicular scatter. When particles are close in size to the wavelength of the light being scattered, the scattering takes on complex patterns which must be considered in detail before accurate predictions of scattering behavior can be made. By careful choice of very small refractive and reflective particles, a preferential perpendicular scattering can be obtained for certain wavelengths of light. Small randomly oriented, thin flakes of silver or aluminum make excellent light scattering particles, since they provide a high amount of perpendicular scatter as well as a high amount of back scatter. Another source of excellent scattering particles are reflective dielectric film mirrors deposited upon a very thin glass substrate and subsequently broken up into small dielectric mirror flakes. These flakes have low absorption light losses, and the flat flakes provide high perpendicular scattering with less back scattering than metallic flakes. Although flakes formed from dielectric film mirrors may cause color separations of reflected and transmitted light so that the optical fiber gives off points of colored light, these points of colored light will blend to form white light when viewed at a distance. Also, a more uniform color scattering of the white light passing through the optical fiber can be achieved by forming the flakes from several different film thicknesses of dielectric mirror. These different thicknesses deposited on glass can be fabricated and broken into dielectric mirror flakes for use in doping an optical fiber core. Since the color reflection and transmission properties of a dielectric mirror/filter are determined by the film thickness and spacings thereof, a variety of film thicknesses could be used to insure a more uniform color scattering.

A number of methods may be employed to incorporate light scattering particles into the core of an optical fiber. With glass and plastic cores, a simple method is to mix the light scattering particles with the molten core material before extruding the material as an optical fiber. It is also possible for the light scattering particles or dopant to be impressed into the optical fiber after the core is drawn but before cladding is added. The core strand could have glass or metal light scattering particles sprayed into it just as the strand emerges from the die, for at this point, the core strand will still be hot and soft. The particles will penetrate the soft fiber, and the fiber will flow and seal the openings in the core made by the passage of the particles. The particles can also be sprayed into the core strand at an elevated temperature after the strand is formed so that they will melt the adjacent core material after penetration and help seal themselves within the fiber.

In place of the dopant injection and mixing methods mentioned, it is possible to add light scattering means to the optical fiber cores after fabrication is complete. One method for doing this is by irradiating the optical fibers with high energy nuclear particles such as alpha rays, beta rays or the like. It is well known that some forms of nuclear radiation, particularly ionizing radiation, will cause a string of microscopic bubbles to be formed along the radiation path as it passes through certain plastics. This effect could be used by irradiating optical fibers along portions of their length with such radiation so as to produce bubbles in the plastic cores of the optical fibers. These bubbles, in turn, will cause scattering of light in the same manner as particles added to the fiber core.

It is even possible to add light scattering bubbles to a light emitting fabric woven from optical fibers. To accomplish this, an ion accelerator could be used to irradiate the optical fiber fabric, and if desirable, such irradiation could be used to form a precise pattern or design on the fabric. Alternatively, very small glass or metal particles could be sprayed at high velocity into an optical fiber fabric so as to penetrate through the cladding and lodge in the core portions of the optical fibers. Then, low index of refraction coatings or an encapsulating medium may be applied to the optical fiber to replace the damaged areas of the cladding caused by the passage of the particles into the core region. For best results, the applied coating or encapsulating medium would have an index of refraction equal to, or less than, that of the optical fiber cladding.

Finally, bubbles can be formed within the core of plastic optical fibers by precisely focused laser beams which will cause chemical breakdown boiling of the plastic in a localized region within the core material. Upon cooling, a bubble will remain, and charring, which would cause blackened bubbles within the plastic core, is avoided because there is no oxygen within the core region to contribute to an oxidation process. It must be noted that most methods for adding dopants after optical fiber fabrication is complete do not lend themselves well to use for glass optical fibers.

Scattering particles having special geometric shapes may be incorporated within optical fibers, and the particles may have prism shapes or be fragments of diffraction gratings to scatter the various spectral colors. The optical fibers and their associated light scattering means may be designed to transmit and scatter visible light, ultraviolet light, infrared radiation, or any useful range of electromagnetic radiation. Also, the scattering particles may be systematically oriented or located within the optical fiber cores to achieve a desired light scattering effect. In particular, if flake shaped mirror particles are used, they may be oriented to generally lie at a 45° angle with respect to the light flow or central longitudinal axis of the optical fiber. Such a specialized orientation may be achieved by beaming sound waves of a particular orientation into the die used to extrude the doped fibers. Once the core is doped, the resultant fiber may be left unclad, or may be coated with a cladding material in the conventional manner.

Figure 2:
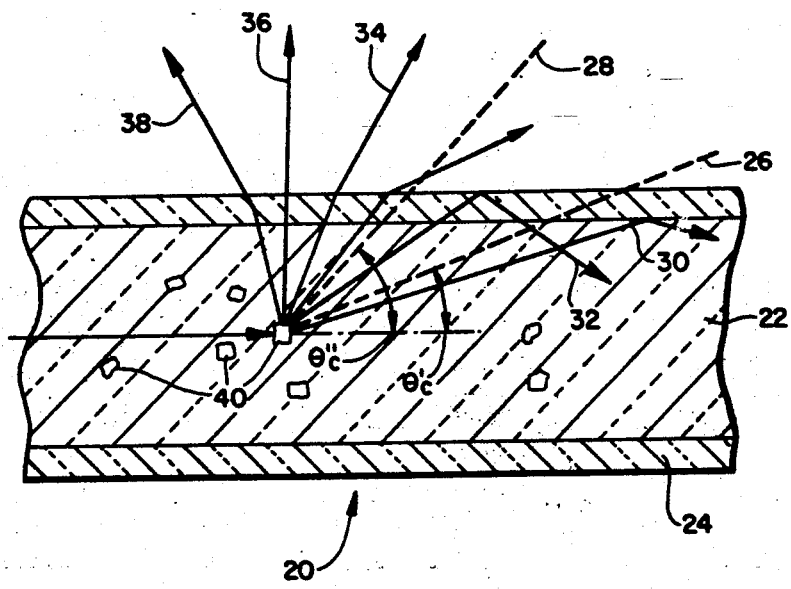
FIG. 2 is a longitudinal sectional view of the optical fiber of the present invention.

Referring now to FIG. 2, a doped optical fiber 20 is illustrated which, includes a plastic core material 22 and a cladding layer 24. The optical fiber, like the other clad fibers to be used with the present invention, permits light to escape through the cladding layer at an angle which is greater than a specific critical angle. Such optical fibers actually have two critical angles as shown in FIG. 2 by the dashed lines 26 and 28. The core material 22 has a critical angle of $\theta_c'$ while the cladding layer 24 has a critical angle of $\theta_c''$. Light rays which scatter at angles of less than $\theta_c'$ remain trapped within the core portion of the optical fiber, as illustrated by the ray 30. Similarly, light rays at angles of less than $\theta_c''$ but greater than $\theta_c'$ remain trapped within the core and cladding of the optical fiber as illustrated by the light ray 32. On the other hand, light rays having scattering angles greater than $\theta_c''$ escape from the optical fiber into the surrounding air or other medium as illustrated by the rays 34, 36 and 38. Normally, much of the light entering an optical fiber is passed through the fiber at angles less than the critical angle, and therefor remains within the fiber for transmission end to end. However, the introduction of a scattering particle 40 into the fiber core 22, causes beams of light 34, 36 and 38 to be reflected or refracted outwardly at angles greater than the critical angle. If the surrounding medium is air, and if the high yield condition could be reached wherein scattering particles 40 scatter the light equally in all directions, then the scattered light rays 36, which are at angels perpendicular to the optical fiber, have a greater intensity due to the effect of Snell's Law (n1 Sin $\theta_1$ = n2 Sin $\theta_2$). This is a very desirable feature of the present invention as contrasted to the various methods of scratching or deforming the optical fiber previously known which operate to scatter light at shallow angles.

Figure 3:
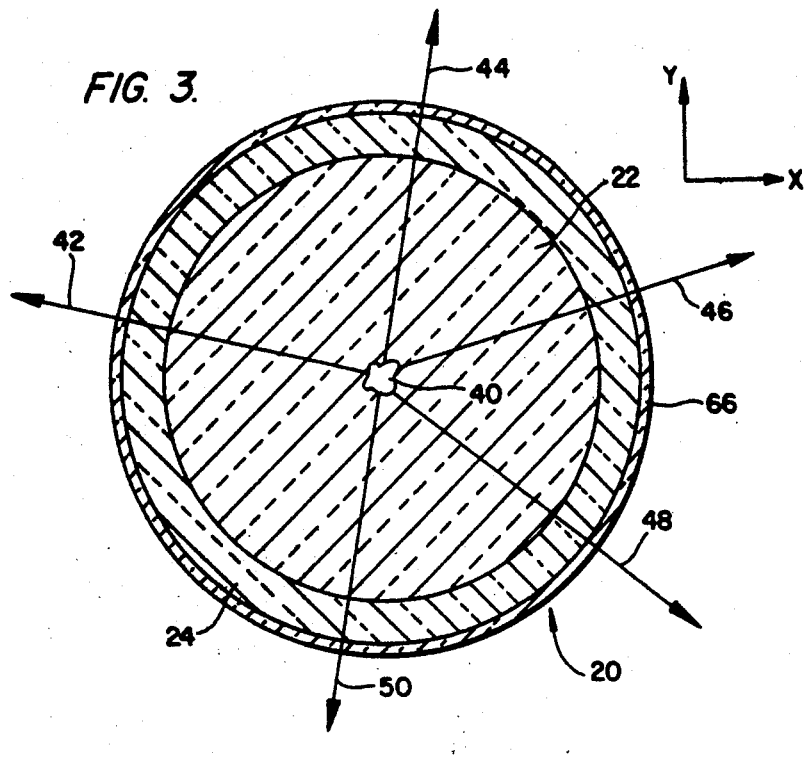
FIG. 3 is a cross sectional diagrammatic view of the optical fiber of the present invention showing the location of a single deflecting particle adjacent the fiber center.
Figure 4:
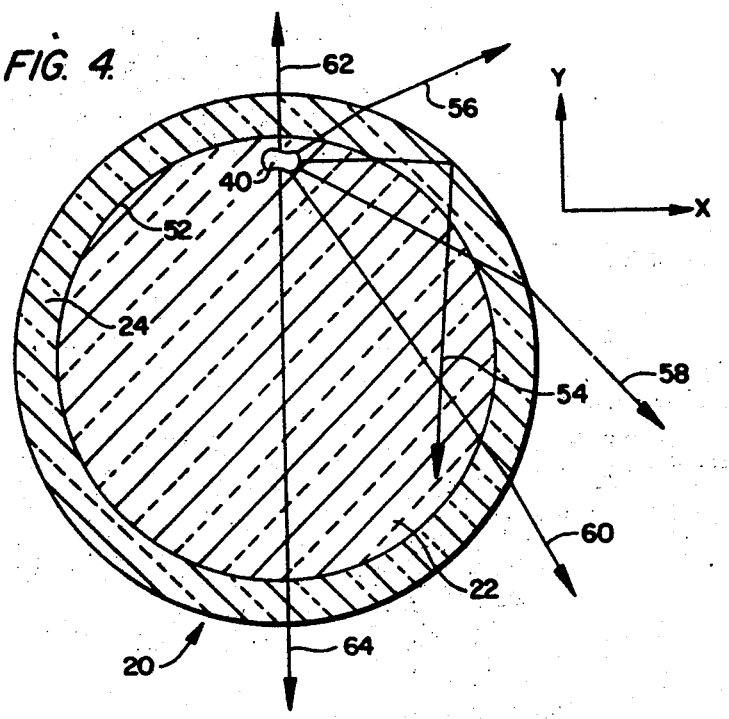
FIG. 4 is a cross sectional diagrammatic view of the optical fiber of the present invention showing the location of a single deflecting particle adjacent the core-cladding interface.

As shown in FIGS. 3 and 4, the position of the light scattering particles 40 within the core 22 has an effect upon the nature of the light emitted from the optical fiber. Light rays which are scattered by the particles located at or adjacent the center of the optical fiber, as shown in FIG. 3, will scatter out of the fiber in the X-Y plane essentially undeflected, provided that the angular components of the light rays along the central axis of the core have a $\theta$ angle greater than $\theta_c''$. This is illustrated by the light rays 42, 44, 46, 48 and 50 in FIG. 3. On the other hand, if the scattering particle 40 is located near the boundary 52 between the core 22 and cladding layer 24, the scattering of light becomes asymmetrical, and some of the light rays, such as the ray 54, remain trapped within the optical fiber by total internal reflections within the X-Y plane. A scattering particle located near one edge of the optical fiber preferably scatters light out the opposite side of the fiber as shown by the light rays 56, 58 and 60. The rays travelling perpendicular to the edge of the fiber in the X-Y plane are undeflected as shown by the light rays 62 and 64.

If a more uniform light scattering is desired, then it may be desirable to concentrate a high proportion of the light scattering particles 40 near the central axis of the optical fiber as shown in FIG. 3. By preventing the placement of light scattering particles near the core/cladding innerface 52, a greater percentage of light will scatter out of the optical fiber at perpendicular angles in the X-Y plane. One other possible benefit of confining scattering particles to positions near the central longitudinal axis of the core 22 is that light travelling near and parallel to the innerface 52 may move for long distances before being scattered.

Plastic optical fibers are highly susceptible to damage by abrasion, chemical solvents, heat and other environmental factors, for the optical properties of these fibers have been optimized at the expense of other physical properties. The resistance of plastic optical fibers to environmental damage could be greatly improved by providing a coating of nylon or other tough plastic on the fiber over the cladding layer so as to encapsulate the entire optical fiber. Alternatively, it is sometimes desirable to encapsulate a fabric formed from light emitting optical fibers in a plastic or other light transmitting laminate. This cannot effectively be accomplished with the abraded or deformed light emitting fibers of the prior art, for if the optical fibers are scratched or otherwise deformed and then given a nylon coating, the coating will contribute optical properties of its own and light emitted from the deformity will pass into the encapsulating nylon. This occurs because nylon has a greater index of refraction then many plastic core materials. Only light rays having very high scattering angles may escape from the nylon coating, since nylon is a high light absorption medium and has even a greater critical angle than the plastic core material.

The novel plastic or glass optical fiber of the present invention with encapsulated light scattering units permits a nylon coating or the like to be applied to the fibers without having to remove portions of such protective coating to achieve light emission. Thus, as illustrated in FIG. 3, a coating of nylon or similar transparent protective material 66 may be added to the optical fiber 20, and any light that is able to scatter out of the fiber region will also be able to escape from the relatively high index of refraction nylon coating. This is due to the fact that the scattered light rays are merely passing through the coating in the same manner as light passes through a sheet of window glass, and that the optical properties of the doped optical fiber 20 permits transparent coatings to be applied with almost no degradation in light emission. Even though the nylon has a high light absorption, the scattered light needs only to pass through a thin coating 66, thus causing only minor light loss. This does not occur with the deformed fibers of the prior art, for with these fibers, the deformity is located within and on the boundary of the nylon coating. Light passing through the deformity at this boundary layer at a small forward angle is deflected into the nylon layer.

The protective coating 66 may be a colored, transparent plastic, glass, or the like, and may be translucent to add additional light scattering properties to the optical fiber 20. The coating may be several layers thick, may be formed of different transparent substances, and in some instances, the doped optical fiber core 22, the cladding layer 24, the scattering particles 40, and the protective coating 66 may be molded of colored transparent materials. Also, the coating 66 may be molded with protrusions, color filaments running therethrough, or other decorative features.

Figure 5:
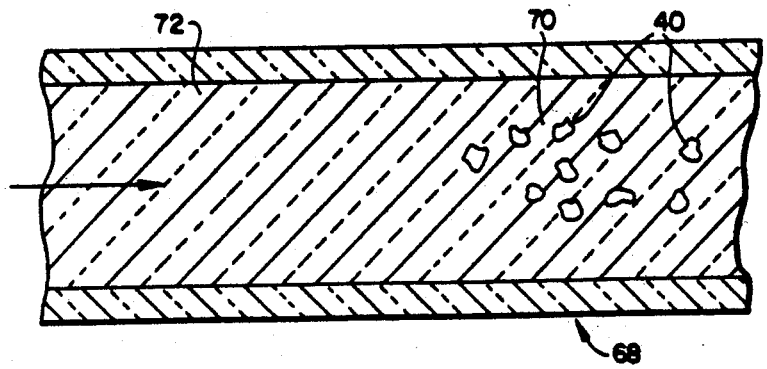
FIG. 5 is a longitudinal sectional view of a second embodiment of the optical fiber of the present invention.

When the optical fiber of the present invention is employed in a woven optical fabric or in some similar lighting fixture, the light is usually beamed into the optical fiber by a suitable transmission lightpipe cable. It would not be desirable to use optical fibers doped with light scattering particles in fabricating the lightpipe cable, so as soon as the doped optical fibers 20 employed in the fabric or lighting fixture reach the edge thereof, they should typically be affixed to a lightpipe transmission source in the shortest possible distance to avoid wasted light emission. A useful variation of this invention would be to manufacture optical fiber which is doped to scatter light in some regions but not in others. For example, the optical fiber may be extruded from a fiber drawing tower in long segments which are doped in one portion of the segment and undoped in the remaining portion of the segment. These individual segments of doped and undoped optical fiber would be part of a continuous strand of glass or plastic optical fiber which can be effectively used in the fabrication of light emitting optical fiber lighting fixtures of either the woven or nonwoven variety. The doped portion of the optical fiber lengths would be fabricated as part of the light emitting portions of the light fixture, while the undoped portions would be formed into part of the lightpipe cable or harnessing fixture. Thus the problem of preventing doped optical fiber from becoming part of the harnessing would be eliminated. FIG. 5 shows a lightpipe 68 wherein light scattering particles 40 are encapsulated within only one section 70 of the lightpipe core while the remaining section 72 is devoid of light scattering particles.

A light fixture formed from the optical fibers of the present invention may be provided with light by a tubular lightpipe having inner walls which are reflective to electromagnetic radiation, particularly the wavelengths of visible, ultraviolet and infrared electromagnetic radiation. The efficient use of a tubular lightpipe requires a very high reflectivity of the inner lightpipe walls, and while dielectric mirrors are highly reflective at certain wavelengths and angles and would appear suitable for lightpipe use, they also exhibit high absorption at other wavelengths and angles so that the average reflectivity of dielectric mirror walls is not sufficiently high. Of existing mirror surfaces, the best combination is to coat the inner tubular walls with a film of silver metal and to subsequently coat the silver with a transparent or protective coating of silicon monoxide or the like. This combination does not depend on interference effects, and thus does not suffer from destructive interference at certain wavelengths and incident angles. Such a combination would be from 96–98% reflective for perpendicular angles of incidence. However, within a lightpipe the light approaches the reflective surface at shallower angles, and thus a 98% reflective silver film with other coatings in a tubular lightpipe would be approximately 99% reflective at an average incident angle of 80°.

Figure 6:
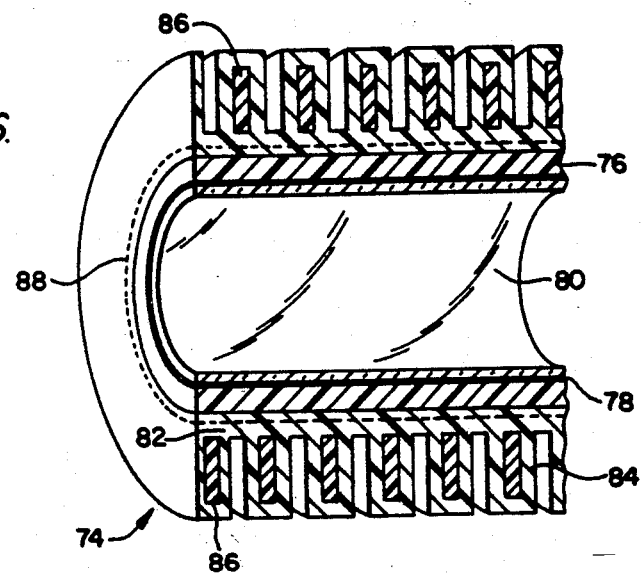
FIG. 6 is a longitudinal sectional view of a lightpipe of the present invention.

FIG. 6 discloses a novel tubular lightpipe 74 constructed in accordance with the present invention. This lightpipe includes a plastic tube 76 formed of polyurethane or similar plastic having the inner tubular surface thereof coated with a film of silver 78 to provide a reflective layer. The silver is then covered with a transparent protective coating of silicon monoxide 80.

The polyurethane tube 76 may be further strengthened by an outer coating of aluminum which is deposited thereon by vacuum or chemical means, and then a second thick layer of polyurethane is coated on the outside to form the tube. Secured to the outer surface of the completed polyurethane tube 76 is an outer jacket 82 of a tough plastic, such as polyvinyl chloride, and this outer jacket is formed with a plurality of spirally extending ribs 84. A spiral winding of spring like plastic material 86 may be embedded in the ribs 84 to extend therethrough and to serve with the ribs and jacket material to keep the tube 76 from being crushed when the lightpipe 74 is bent. The lightpipe may be further strengthened by one or more layers 88 of a strong fabric such as nylon embedded in the outer jacket 82.

The lightpipe 74 may be air or vacuum filled, and the internal reflective layer provided by the layers 78 and 80 may be varied in composition. For example, the protective layer 80 could be glass while the layer 78 could be formed by a highly reflective coating such as aluminum. A novel approach to increasing the reflectance of the mirror surface 78 would be to choose a metallic reflective film that was highly paramagnetic or ferromagnetic and is therefore a good parallel polarizer. This metallic reflective layer would then be combined with a transparent reflective coating in the surface 80 which is a good perpendicular polarizer. With this combination, light passing through the transparent coating will be partially parallel polarized, and since the metal layer 78 is reflective to parallel polarized light, the overall reflectivity is enhanced. Multiple layers of parallel and perpendicular polarizing materials can be used to further enhance this effect, and a highly polarizing crystal substance can be used in place of a transparent diamagnetic glass surface 80 to further increase the effect.

Figure 7:
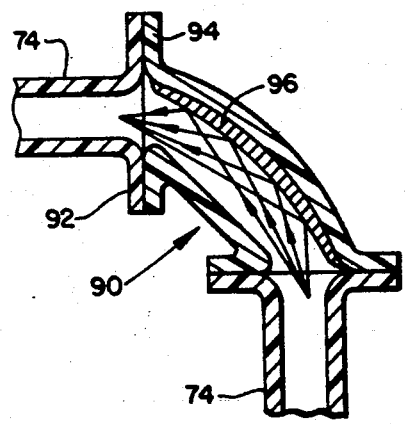
FIG. 7 is a longitudinal sectional view of an elbow for the lightpipe of FIG. 6.

When light is to be directed from one tubular lightpipe 74 into a second tubular lightpipe positioned perpendicular thereto, a light transmitting elbow 90 of the type shown in FIG. 7 may be employed. Each of the tubular lightpipes 74 is provided with an outwardly flaring flange 92 at the end thereof which mates with a flange 94 at the end of the hollow cylindrical elbow 90. An elipictal mirror surface 96 is provided internally within the elbow 90 to conduct light from one tubular lightpipe into the other. Circular misalignment collar mirrors are provided to limit losses around the fringe of the light beam.

The tubular lightpipe 74 may be replaced with a single strand optical fiber lightpipe having a core of about 0.5 to 0.75 inches in diameter. This single efficiency as a conventional multi-strand lightpipe made of the same materials. Furthermore, a single strand lightpipe could be made flexible enough to bend into a six inch radius curve by using suitable flexible plastics. The problem is that some light which is travelling near critical angles will tend to escape around the sharp bends as the critical angle is reduced.

Figure 8:
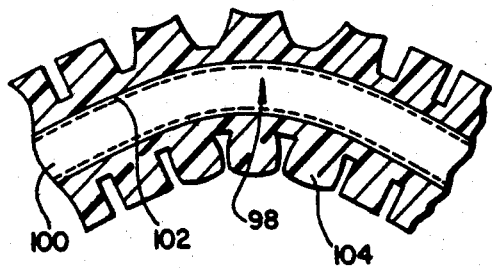
FIG. 8 is a longitudinal sectional view of a second embodiment of the lightpipe of the present invention.

The novel lightpipe 98 of FIG. 8 solves these problems by limiting the amount that the pipe may be bent to some predtermined radius. This lightpipe includes a central core of plastic 100 having a cladding layer 102. Safety ribs 104 are formed on the outer surface of the cladding layer and are spaced apart for a distance which will only permit bending of the lightpipe to an angle which is less than the critical angle of light passing therethrough. When the desired radius of bend is reached, the ribs contact one another in the area of the bend as illustrated at the bottom of the lightpipe 98 of FIG. 8 and prevent further bending of the pipe.

INDUSTRIAL APPLICABILITY

The novel optical lightpipes of the present invention may be effectively employed in light emitting fabrics and other lighting assemblies. The optical fibers of the present invention operate to effectively scatter light along the fiber lengths, and therefore may be woven into a very effective light emitting fabric. This fabric may be laminated or encapsulated within another transparent medium. The tubular or optical fiber lightpipe or this invention operates effectively to transmit light from a light source to a lighting implement formed of the light emitting fiber.

I claim:

1. An optical fiber comprising an elongated light transmitting core means and electromagnetic radiation scattering means embedded in said core means, said electromagnetic radiation scattering means serving to scatter electromagnetic radiation passing longitudinally through said optical fiber laterally outwardly from the core means of said optical fiber and including small particles relatively spaced within said core means, said small particles being particles of nontransparent, reflective material.

2. The optical fiber of claim 1 wherein said small particles are concentrated in an area adjacent the central longitudinal axis of said core means.

3. The optical fiber as set forth in claim 1 wherein said light transmitting core means is covered by a light transmitting material.

4. The optical fiber as set forth in claim 1 wherein said small particles are angularly oriented relative to the central longitudinal axis of said core means in a predetermined angular relationship.

5. The optical fiber as set forth in claim 1 wherein said light transmitting core means is coated with a cladding means, said cladding means being operative to pass light transmitted thereto at angles greater than a critical angle and to reflect light at angles less than said critical angle.

6. The optical fiber as set forth in claim 5 wherein said core and cladding means are covered by a light transmitting material encapsulating said cladding means.

7. An optical fiber comprising an elongated light transmitting core means and electromagnetic radiation scattering means embedded in said core means, said electromagnetic radiation scattering means serving to scatter electromagnetic radiation passing longitudinally through said optical fiber laterally outwardly from the core means of said optical fiber and including small particles relatively spaced within said core means, said small particles being a mixture of reflective and refractive particles.

8. The optical fiber of claim 7 wherein said small particles are concentrated in an area adjacent the central longitudinal axis of said core means.

9. The optical fiber as set forth in claim 7 wherein said light transmitting core means is coated with a cladding means, said cladding means being operative to pass light transmitted thereto at angles greater than a critical angle and to reflect light at angles less than said critical angle.

10. The optical fiber as set forth in claim 9 wherein said core and cladding means are covered by a light transmitting material encapsulating said cladding means.

11. An optical fiber comprising an elongated light transmitting core means and electromagnetic radiation scattering means embedded in said core means, said electromagnetic radiation scattering means serving to scatter electromagnetic radiation passing longitudinally through said optical fiber laterally outwardly from the core means of said optical fiber and including small particles relatively spaced within said core means, said small particles being dielectric mirror flakes.

12. The optical fiber of claim 11 wherein said dielectric mirror flakes are of a number of different thicknesses.

13. An optical fiber comprising an elongated light transmitting core means and electromagnetic radiation scattering means embedded in said core means, said electromagnetic radiation scattering means serving to scatter electromagnetic radiation passing longitudinally through said optical fiber laterally outwardly from the core means of said optical fiber and including small particles relatively spaced within said core means, said small particles being metal flakes.

14. A method for forming an optical fiber of light transmitting material capable of extrusion which includes placing said light transmitting material in a molten state, mixing light scattering particles with said molten light transmitting material and extruding such mixture to form an elongated fiber.

15. The method defined by claim 14 wherein said light scattering particles are a mixture of reflective and refractive particles.

* * * * *